US007865965B2

United States Patent
Kramer et al.

(10) Patent No.: US 7,865,965 B2
(45) Date of Patent: Jan. 4, 2011

(54) OPTIMIZATION OF DISTRIBUTED ANTI-VIRUS SCANNING

(75) Inventors: Michael Kramer, Yonkers, NY (US); Edward W. Schaefer, Lake Ronkonkoma, NY (US); Brett A. Tanzer, Northport, NY (US); Christopher De Luca, Kings Park, NY (US)

(73) Assignee: Microsoft Corporation, Redmond, WA (US)

( * ) Notice: Subject to any disclaimer, the term of this patent is extended or adjusted under 35 U.S.C. 154(b) by 868 days.

(21) Appl. No.: 11/763,795

(22) Filed: Jun. 15, 2007

(65) Prior Publication Data

US 2008/0313733 A1    Dec. 18, 2008

(51) Int. Cl.
*H04N 7/16* (2006.01)
(52) U.S. Cl. .......................................... 726/30
(58) Field of Classification Search ........................ None
See application file for complete search history.

(56) References Cited

U.S. PATENT DOCUMENTS

| | | | |
|---|---|---|---|
| 6,094,731 A | 7/2000 | Waldin et al. | |
| 6,748,534 B1 | 6/2004 | Gryaznov et al. | |
| 6,851,058 B1 | 2/2005 | Gartside | |
| 6,928,555 B1 | 8/2005 | Drew | |
| 6,993,660 B1 | 1/2006 | Libenzi et al. | |
| 7,065,790 B1 | 6/2006 | Gryaznov | |
| 7,069,594 B1 | 6/2006 | Bolin | |
| 7,076,650 B1 | 7/2006 | Sonnenberg | |
| 7,107,618 B1 | 9/2006 | Gordon et al. | |
| 7,152,164 B1 | 12/2006 | Loukas | |
| 7,215,956 B2 | 5/2007 | Liu et al. | |
| 2003/0023864 A1 | 1/2003 | Muttik et al. | |
| 2003/0023866 A1 | 1/2003 | Hinchliffe et al. | |
| 2003/0191957 A1 | 10/2003 | Hypponen et al. | |
| 2004/0117401 A1 | 6/2004 | Miyata et al. | |

(Continued)

FOREIGN PATENT DOCUMENTS

WO    WO0239665 A2    5/2002
WO    WO2006119509 A2   11/2006

OTHER PUBLICATIONS

"AVX Professional 5.9.1" retrieved on Mar. 27, 2007, at <<http://www.freedownloadscenter.com/Utilities/Anti-Virus_Utilities/AVX_Professional.html>>, Free Downloads Center, 2006, pp. 1-3.

(Continued)

*Primary Examiner*—Brandon S Hoffman
(74) *Attorney, Agent, or Firm*—Lee & Hayes, PLLC

(57) ABSTRACT

Techniques for optimizing distributed anti-virus (AV) scanning are described. In one implementation, a message is received into a multi-node network that includes a plurality of distributed scanning tools. An acceptable scanning policy threshold is determined that is representative of a plurality of individual scanning policy configurations of the plurality of scanning tools. A determination is made whether the message has previously been scanned to the acceptable scanning policy threshold based on a single valued element. If the message has been previously scanned, the message is allowed to be communicated. Otherwise, the message is scanned at the acceptable scanning policy threshold. If the scanning is successful, then the message is marked as having been scanned, and is allowed to be communicated. If the scanning is unsuccessful, the message is prevented from being communicated.

20 Claims, 5 Drawing Sheets

U.S. PATENT DOCUMENTS

| | | | |
|---|---|---|---|
| 2006/0025149 | A1 | 2/2006 | Karaoguz et al. |
| 2006/0236398 | A1 | 10/2006 | Trakic et al. |
| 2006/0259967 | A1 | 11/2006 | Thomas et al. |
| 2006/0294589 | A1 | 12/2006 | Achanta et al. |
| 2007/0038637 | A1 | 2/2007 | Taneja et al. |
| 2007/0070921 | A1 | 3/2007 | Quinlan et al. |
| 2007/0079379 | A1* | 4/2007 | Sprosts et al. ........... 726/24 |

OTHER PUBLICATIONS

"Microsoft Antigen for Exchange", available at least as early as Mar. 26, 2007, at <<http://download.microsoft.com/download/6/9/d/69db7783-fe2c-4736-9231-0ec6ceeeaca4/Antigen_Exchange.pdf>>, Microsoft Corporation, 2006, pp. 1-2.

"Microsoft Exchange Server 2007 Product Guide", available at least as early as Mar. 26, 2007, at <<http://download.microsoft.com/download/9/9/c/99c1fe21-9156-4ef6-bc41-3f82e226935f/Exchange_Server_2007_Product_Guide.pdf>>, Microsoft Corporation, 2006, pp. 1-16.

"Microsoft Forefront Overview," retrieved on Mar. 28, 2007 at <<http://www.microsoft.com/forefront/2006/prodinfo/overview.mspx>>, Microsoft Forefront, 2007, pp. 1-2.

PCT International Search Report and the Written Opinion for Application No. PCT/US2008/065957, mailed Dec. 22, 2008, 10 pgs.

* cited by examiner

OPTIMIZATION OF DISTRIBUTED ANTI-VIRUS SCANNING

BACKGROUND

A typical deployment of an enterprise's messaging system uses a distributed architecture in which different message processing roles are in effect on different servers. To protect the messaging infrastructure, protection software such as anti-virus (AV) scanning can be loaded on multiple servers throughout the messaging system. One example system which has multiple server roles deployed throughout the enterprise is the Exchange® program commercially available from Microsoft Corporation of Redmond, Wash. In Exchange, a single message can travel through any number of transport servers before being deposited in a mailbox server for storage and retrieval.

To help relieve the burden of duplicate scanning, Exchange has included a feature which adds and maintains a persistent secure marker on a message to indicate that the message has already been processed by a security component on one of the servers in the enterprise at a particular configuration version. When a message with a secure marker is encountered, Exchange assumes that the secure marker reflects an absolute guarantee that the message has been already scanned and is in a known state, and thus, may not need to be re-scanned.

The conventional wisdom, however, is that only if the protections are identical in each distributed protection point should the scanning at each protection point be considered duplicate scanning. For complex protection software products that have many different configuration settings, the representation of the state of protection applied to a message may be difficult. This poses the choice between devising a complex representation of what it means to be "already scanned" and with this complex representation, using a multiple valued marker to represent the protection applied to each message, or alternatively not marking the message as already scanned, and always requiring duplicate protection scanning to insure that different settings are always applied to a message as it is scanned on each server.

SUMMARY

Optimizing distributed anti-virus (AV) scanning techniques are described that eliminate duplicative scanning of messages within a messaging system of a distributed computing environment. Such techniques may operate with a variety of scanning tools having disparate scanning criteria and capabilities, and may advantageously improve the efficiency of the computing environment.

In one implementation, a message is received into a multi-node network. The multi-node network may include a plurality of distributed scanning tools (or protection points) distributed throughout the network. An acceptable scanning policy threshold is determined that is representative of a plurality of individual scanning policy configurations of the plurality of scanning tools. A determination is made whether the message has previously been scanned to the acceptable scanning policy threshold. The determination may be based on a single valued element, even though the message may have been scanned with a complex, multi-faceted scanning program based on a plurality of scanning criteria. If the message has been previously scanned, the message is allowed to be communicated without being rescanned. Otherwise, the message is scanned at the acceptable scanning policy threshold. If the scanning is successful (i.e. no viruses detected), then the message is marked as having been scanned, and is allowed to be communicated to another component of the multi-node network. If the scanning is unsuccessful, however, the message is prevented from being disseminated within the multi-node network, at least until the acceptable scanning policy threshold is enforced.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the use of the same reference numbers in different figures indicates similar or identical items.

DETAILED DESCRIPTION

Techniques for optimizing distributed anti-virus scanning are disclosed herein. Generally, anti-virus scanning methods in accordance with the present disclosure provide that incoming messages are scanned once and only once in a distributed system of protection points without the need for a complex multi-valued marker. Such methods eliminate duplicative scanning using two control elements. A first element is a minimum threshold which establishes a lowest acceptable criterion (or set of criteria) for considering a message to be "already scanned" and protected. A second element is a single valued marker which is applied to the message when the minimum threshold is achieved. As the message transmits through each node in the distributed system, this two level protection system (already scanned/not already scanned) is used to determine if the message has already been scanned (or processed) as it traverses through the multiple server system.

As used herein, the term "message" is used to refer to any type or format of information packets or objects, including text and hypertext messages, HTML messages, and any other suitable message formats, and also including message attachments, including text files, graphics files, HTML files, webpages, or any other computer-readable objects.

Also, as used herein, the term "anti-virus" is used to refer to any scanning technology which can detect and mitigate against threats against a computer system, those threats which include viruses, worms, Trojans, spyware, and all such malware.

The result of methods and systems in accordance with the present disclosure is a simple optimization scheme to insure that a message is protection-scanned only once in a distributed system without resorting to complex state representations which have to be applied to each message. The resulting marker, instead of being an absolute guarantee of the message being in a known state, is an indication that the message has exceeded a safety threshold or is in conformance with policy above a certain threshold.

Exemplary Environment

Figure 1:
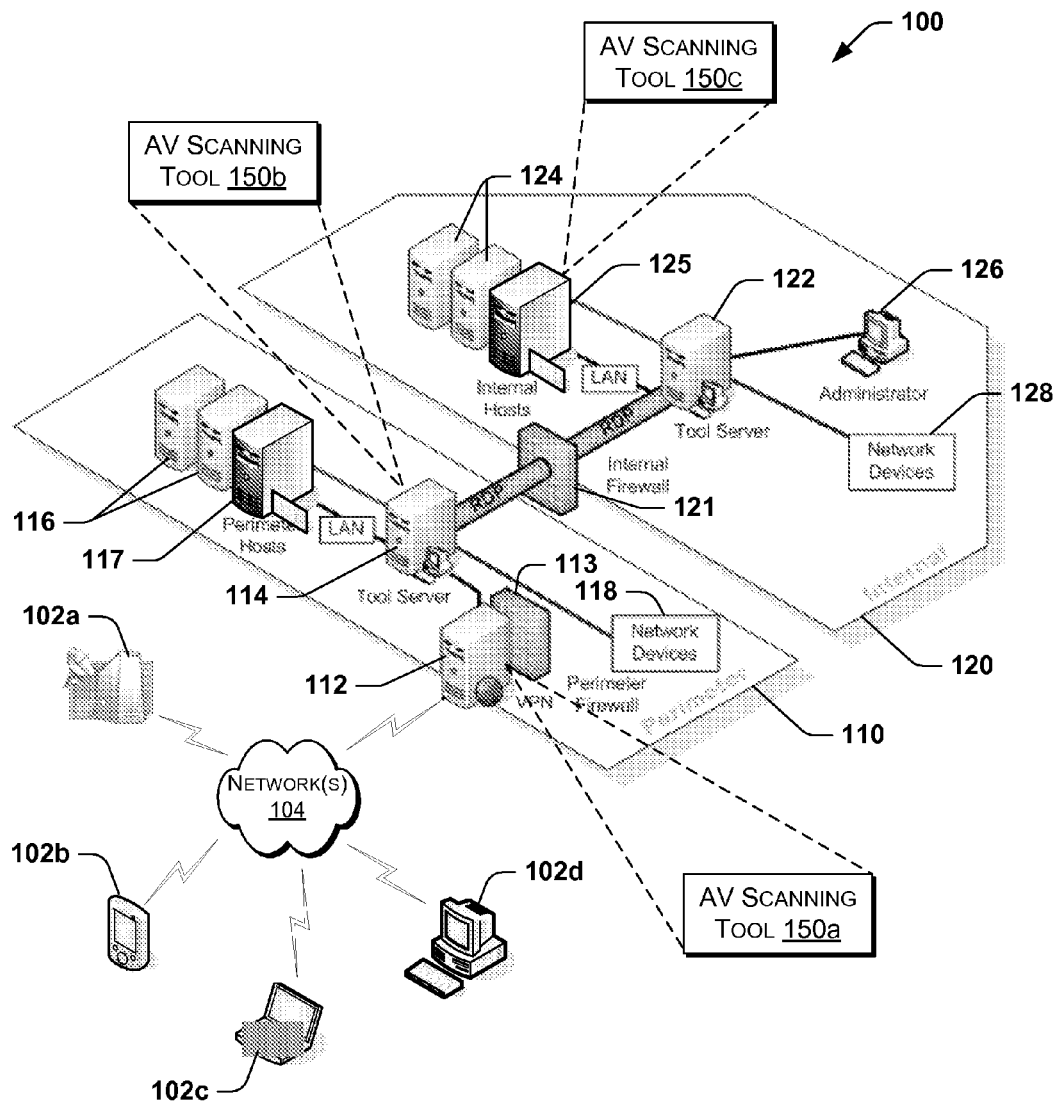
FIG. 1 illustrates an exemplary environment for implementing techniques for optimizing distributed anti-virus scanning in accordance with the present disclosure.

FIG. 1 illustrates an exemplary environment 100 for implementing techniques for optimizing distributed anti-virus scanning in accordance with the present disclosure. In this embodiment, the environment 100 includes a perimeter network portion 110 coupled to a plurality of messaging devices 102 through one or more outside networks 104, and an internal network portion 120 coupled to the perimeter network portion 110.

Both the perimeter and internal network portions 110, 120 include one or more servers, or other suitable components and platforms. More specifically, in this embodiment, the perimeter network portion 110 includes a gateway server 112 that receives incoming messages sent by the messaging devices 102 via the outside network 104. A perimeter firewall 113 is situated between the gateway server 112 and a perimeter tool server 114. A plurality of perimeter hosts 116, a perimeter email server 117, and one or more other perimeter network devices 118 operatively communicate with the tool server 114. Similarly, an internal firewall 121 is disposed between the perimeter network portion 110 and an internal tool server 122 of the internal network portion 120. A plurality of internal hosts 124, an internal email server 125, an administrator 126, and one or more other internal network devices 128 operatively communicate with the internal tool server 122.

As further shown in FIG. 1, a plurality of anti-virus (AV) scanning tools 150 are installed on various components of the perimeter and internal network portions 110, 120 of the environment 100. For example, in this exemplary environment 100, a first AV scanning tool 150a is installed on the gateway server 112, a second AV scanning tool 150b is installed on the perimeter tool server 114, and a third AV scanning tool 150c is installed on the internal email server 125. The AV scanning tools 150 may include aspects of complex, multi-state AV scanning tools, such as the Forefront program commercially-available from the Microsoft Corporation of Redmond, Wash. In accordance with the teachings of the present disclosure, however, the AV scanning tools 150a, 150b, 150c are further configured to examine messages, perform anti-virus scanning on the messages if necessary, and to "stamp" or otherwise designate each message as "already scanned" after confirming that the message has been scanned to an established threshold condition.

Thus, using a two-element scanning scheme as described more fully below, the AV scanning tools 150 ensure that a message is protection-scanned only once in a distributed system (e.g. environment 100) without resorting to complex state representations which have to be applied to each message. Each message is scanned and marked once, with the marker providing an indication that the message has exceeded a desired safety threshold.

Exemplary Devices for Optimized AV Scanning

Figure 2:
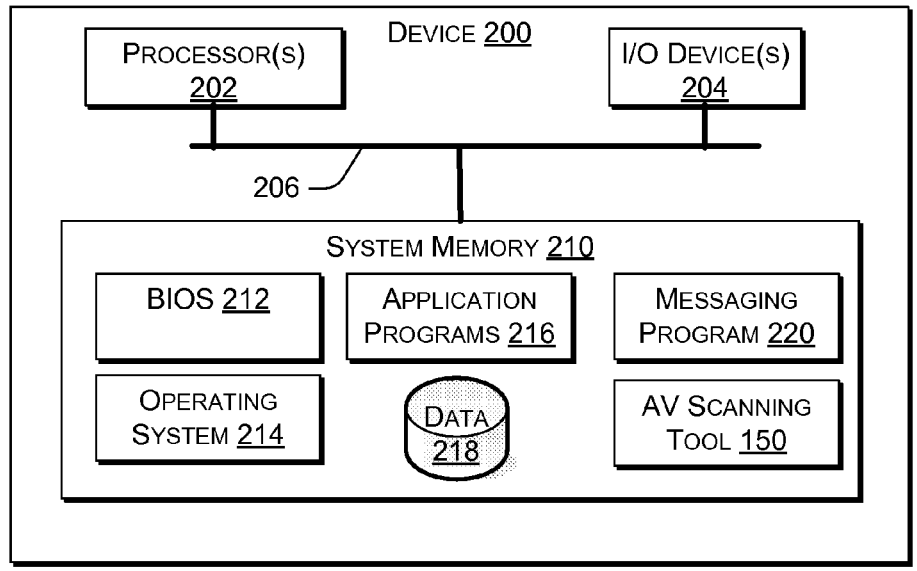
FIG. 2 shows an exemplary device having an anti-virus scanning tool configured for optimized anti-virus scanning.

FIG. 2 shows an exemplary device 200 having an anti-virus scanning tool 150 configured for optimized anti-virus scanning. With reference to the exemplary environment 100 shown in FIG. 1, the device 200 may therefore represent the gateway server 112, the perimeter tool server 114, or the internal email server 125, or any other component of the environment 100 suitably equipped with the AV scanning tool 150.

In the embodiment shown in FIG. 2, the device 200 includes one or more processors 202 and one or more input/output (I/O) components 204 (e.g., keyboard, mouse, transmitter, receiver, etc.) coupled to a system memory 210 by a bus 206. The system bus 206 represents any of the several types of bus structures, including a memory bus or memory controller, a peripheral bus, an accelerated graphics port, and a processor or local bus using any of a variety of bus architectures.

The system memory 210 includes computer-readable media configured to store data and/or program modules for implementing the techniques disclosed herein that are immediately accessible to and/or presently operated on by processor(s) 202. The AV scanning tool 150 is stored in the system memory 210 and executable on the processor(s) 202. For example, in the embodiment shown in FIG. 2, the system memory 210 stores a basic input/output system (BIOS) 212, an operating system 214, one or more application programs 216, and program data 218 that can be accessed by the processor(s) 202 during execution of the AV scanning tool 150. A messaging program 220 (e.g. Exchange®, Outlook®, etc.) may also be stored on the system memory 210 to send and receive messages in cooperation with the AV scanning tool 150.

The computer-readable media included in the system memory 210 can be any available media that can be accessed by the device 200, including computer storage media and communication media. Computer storage media include both volatile and nonvolatile, removable and non-removable media implemented in any method or technology for storage of information such as computer-readable instructions, data structures, program modules, or other data. Computer storage media includes, but is not limited to, and random access memory (RAM), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information and which can be accessed by computer 200.

Similarly, communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

Generally, program modules executed on the device 200 (FIG. 2) may include routines, programs, objects, components, data structures, etc., for performing particular tasks or implementing particular abstract data types. These program modules and the like may be executed as a native code or may be downloaded and executed such as in a virtual machine or other just-in-time compilation execution environments. Typically, the functionality of the program modules may be combined or distributed as desired in various implementations.

Figure 3:
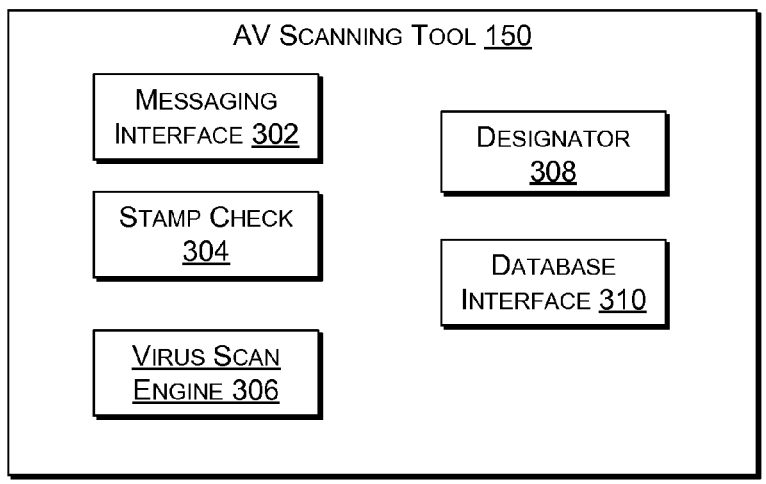
FIG. 3 is a block diagram of the anti-virus scanning tool configured for optimized anti-virus scanning of FIG. 2.

FIG. 3 is a block diagram of an exemplary embodiment of the anti-virus (AV) scanning tool 150 of FIGS. 1 and 2. In this embodiment, the AV scanning tool 150 includes a messaging interface 302 that is configured to receive an incoming message, such as by interfacing with the messaging program 220

(FIG. 2). A stamp check component 304 analyzes the message received by the messaging interface 302, and more specifically a first element associated with the message, to determine whether the message has been stamped (or otherwise designated) as "already scanned."

A virus scanning engine 306 is configured to scan the message received by the messaging interface 302 to a lowest acceptable criterion (or set of criteria) for considering a message to be "already scanned" and protected. The virus scanning engine 306 may determine the lowest acceptable criterion in any suitable way. For example, in one implementation, the AV scanning tool 150 includes a database interface component 310 that enables the AV scanning tool 150 to access the data 218 stored in the system memory 210 (FIG. 2) to obtain the lowest acceptable criterion (or set of criteria). Alternately, the AV scanning threshold is periodically or randomly updated to the AV scanning tool 150 and stored for future scanning activities. After the AV scanning engine 306 scans the incoming message, and assuming the message passes the AV scan by the engine 306, a designator component 308 stamps (or otherwise designates) the message as being "already scanned" after the virus scanning engine 306 scans the message in accordance with the threshold criterion.

Having described an exemplary environment 100, an exemplary device 200, and an exemplary embodiment of the AV scanning tool 150, exemplary processes for anti-virus scanning in accordance with the present disclosure will be described in the following section.

Exemplary Processes for Optimized AV Scanning

Processes in accordance with the present disclosure for anti-virus (AV) scanning in an environment having a plurality of protection points distributed throughout a messaging system advantageously use two control elements to reduce or eliminate duplicative scanning. In general, such AV scanning processes are intended to ensure that incoming messages are scanned once and only once, even for sophisticated protection software products having many different configuration settings, thereby improving the overall efficiency of the environment.

Figure 4:
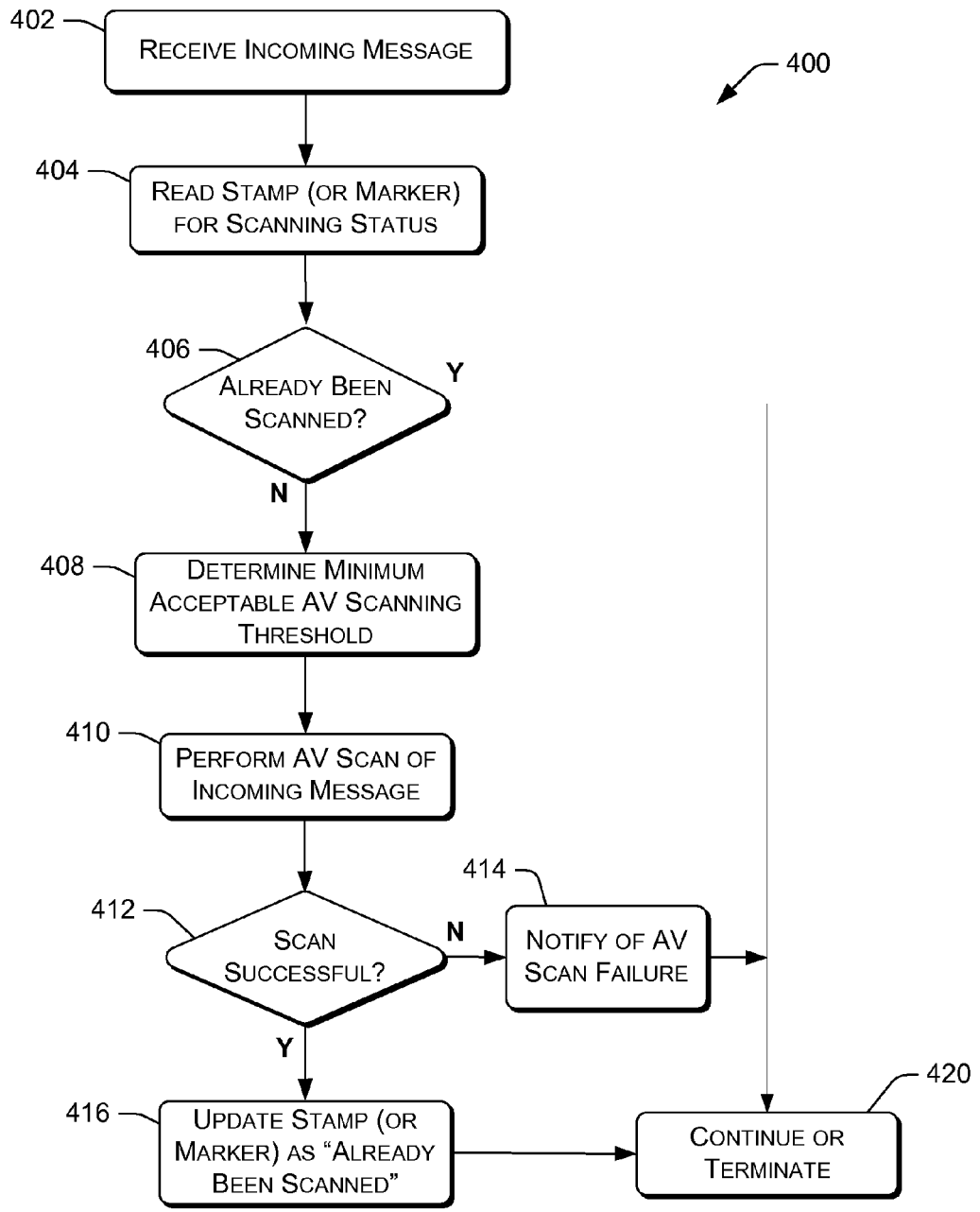
FIG. 4 is a flow chart of a method of performing optimized anti-virus scanning.

For example, FIG. 4 is a flow chart of a method 400 of performing optimized anti-virus scanning. The process 400 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For discussion purposes, the process 400 will be described with reference to the exemplary components described above with reference to FIGS. 1 through 3.

In the embodiment shown in FIG. 4, an incoming message is received at 402. The incoming message may, for example, be received into the messaging program 220 of the device 200, and then passed to the messaging interface 302 of the AV scanning tool 150. Alternately, the incoming message may be received directly into the AV scanning tool 150 (e.g. into the messaging interface 302) prior to delivery to the messaging program 200 or to other components of the environment 100.

The incoming message is analyzed, such as by reading a "stamp" or security certificate (or marker) associated with the incoming message at 404, and a determination whether the message has already been scanned is performed at 406. In some embodiments, such as for the AV scanning tool 150a implemented on the gateway server 112 of the perimeter network portion 110, the reading (404) and determination (406) may be omitted, and all incoming messages from the one or more outside networks 104 may be assumed to have not been scanned.

If it is determined that the incoming message has already been scanned to an acceptable security threshold at 406, then the method 400 proceeds to 420 and continues to other functions (or terminates), thereby avoiding any unnecessary rescanning of the message. On the other hand, if the incoming message has not already been scanned, then the method 400 receives (or inputs) a scanning threshold which establishes a lowest acceptable criterion (or set of criteria) for considering a message to be "already scanned" and protected for all protection points distributed throughout the messaging system (e.g. environment 100). For example, in some embodiments, the AV scanning tool 150 may read a current AV scanning threshold for the entire environment 100 from the data 218 stored in the system memory 210 using the database interface 310 immediately prior to scanning. Alternately, the AV scanning threshold may be updated to each version of the AV scanning tool 150 throughout the environment 100 periodically (e.g. via the administrator 126), or on an ad hoc basis any time an AV security setting for any of the devices is modified, or any time a device is added or removed, within the perimeter and internal network portions 110, 120.

With continued reference to FIG. 4, after the acceptable AV scanning threshold is determined (408), an AV scan of the incoming message is performed at 410. In some embodiments, the AV scan may be performed using one or more protection software products, including relatively complex scanning software products that have many different configuration settings.

The acceptable scanning threshold can be determined by using a heuristic which is coded into the AV system to rate the current configuration as "at or above threshold" or "below threshold". This application of a heuristic to determine if the configuration is above or below threshold can also be implemented as a downloadable data file which specifies a set of rules which is read and acted upon by a heuristics engine.

A determination is made at 412 whether the AV scan was successful, and if not, the method 400 may output a notification of the scan failure at 414 (e.g. to the administrator 126, or to the I/O device(s) 204), and may take any other remedial action to prevent dissemination of the message within the environment 100, including quarantining or destroying the incoming message, notifying the sender of the unsuccessful result of the AV scan, or any other suitable action. The method 400 may then continue to other functions (or terminate) at 420.

If the incoming message passed the AV scan successfully (412), then the stamp (or marker) of the incoming message is updated at 416 to indicate that the message has "already been scanned." In some embodiments, this may be performed using the designator component 308 of the AV scanning tool 150 (FIG. 3). The method 400 may then continue to other functions (or terminate) at 420.

In a particular embodiment, the process 400 may be implemented in an existing AV scanning product, such as the Forefront Security for Exchange Server (or Forefront) product available from Microsoft Corporation. Alternately, the process 400 may be implemented using the AV Stamp Virus scanning API of Exchange 2007, also available from Microsoft, or may also be suitably implemented as generally disclosed, for example, in co-pending, commonly-owned U.S. patent application Ser. No. 11/215,823 entitled "Email Message Hygiene Stamp" by Costea et al., incorporated herein by reference. The process 400 may be further implemented (e.g. using Exchange) in a variety of roles, including: as a Gateway Server in which AV software protects mail at the edge of a corporate network transiting in and out of the Internet; as a Hub Transport component which protects mail as it flows through an internal network; and as a mailbox server which protects mail (e.g. in the Exchange Information Store). In these various roles, techniques in accordance with the present disclosure may be implemented such that, by default, the messages are stamped as already scanned when a threshold condition is satisfied, to examine each message before it is processed, and when a stamp (e.g. a Forefront AV Stamp) is already present on the message, then the message is not processed again.

In some embodiments, the best use of such a distributed optimization technique may be accomplished by making sure that each server (or AV scanning tool) has identical settings. Then, in fact, the threshold protection does also signify an absolute known state of each message throughout the distributed system. However, this may not be enforced by the marker itself, but rather, may be enforced by management techniques for assuring that the nodes are all identically configured. This assures that the real-time management of the marker is as simple as possible, and the complexity of assuring state synchronization is pushed to the management of the servers. The establishment of an acceptable threshold may typically includes a requirement that the message has been anti-virus scanned by at least one engine in order for the "stamp" to be applied to the message.

In further embodiments, a user interface (e.g. one or more of the I/O devices 204 of FIG. 2) may be configured to enable a user to select (or de-select) the option of implementing an optimized scanning process in accordance with the present disclosure. For example, in one particular implementation, a user may designate a check box (or may be selected by default) which may be worded "Optimize for Performance by Not Rescanning Messages Already Virus Scanned—Transport". When such a check box is de-selected, the optimized scanning process in accordance with the present disclosure may be disabled such that all transport nodes (such as gateway or hub transport servers) in the environment will re-scan a message even if it is already stamped as already having been scanned.

In some implementations, by default, a protection software product (e.g. Forefront) running on a transport server may always stamp a message as having been AV scanned as long as the threshold condition is met. When this message arrives at a messaging component (e.g. an Exchange mail store), the stamp may be converted to a "mailbox property" of the message. In a particular implementation, there may be a control registry that can be set on each transport node to override this default which instructs protection software product (e.g. Forefront) to not apply an AV stamp to a message even if the threshold condition is met. Thus, when such a message arrives at the messaging component (e.g. a Mailbox server), the message will be scanned again.

In general, AV scanning processes in accordance with the present disclosure may ensure that incoming messages are scanned once and only once, even for sophisticated protection software products that have many different configuration settings, thereby improving the overall efficiency of the environment. In a multi-state protection system, an object may be determined to have been already protected using a single valued marker, along with a threshold for applying that marker. The application of a marker to an object if the object has achieved a certain threshold of examination as a way of establishing a minimum acceptable safety of the object to other protection points in a distributed system may provide substantial improvements over prior art scanning techniques.

Also, in a multi-state distributed protection system, embodiments of processes in accordance with the present disclosure may examine an object to determine if it has already been protected at a different part of the distributed system for the purpose of eliminating duplicate protection which is deemed wasteful of resources. In further embodiments, an option may be provided for turning off and suppressing the marking of the object as already protected if more complex protection is desired such that more complex multiple settings on different parts of the distributed system are deemed to be important for offering superior protection.

Alternate Embodiments for Optimized AV Scanning

Figure 5:
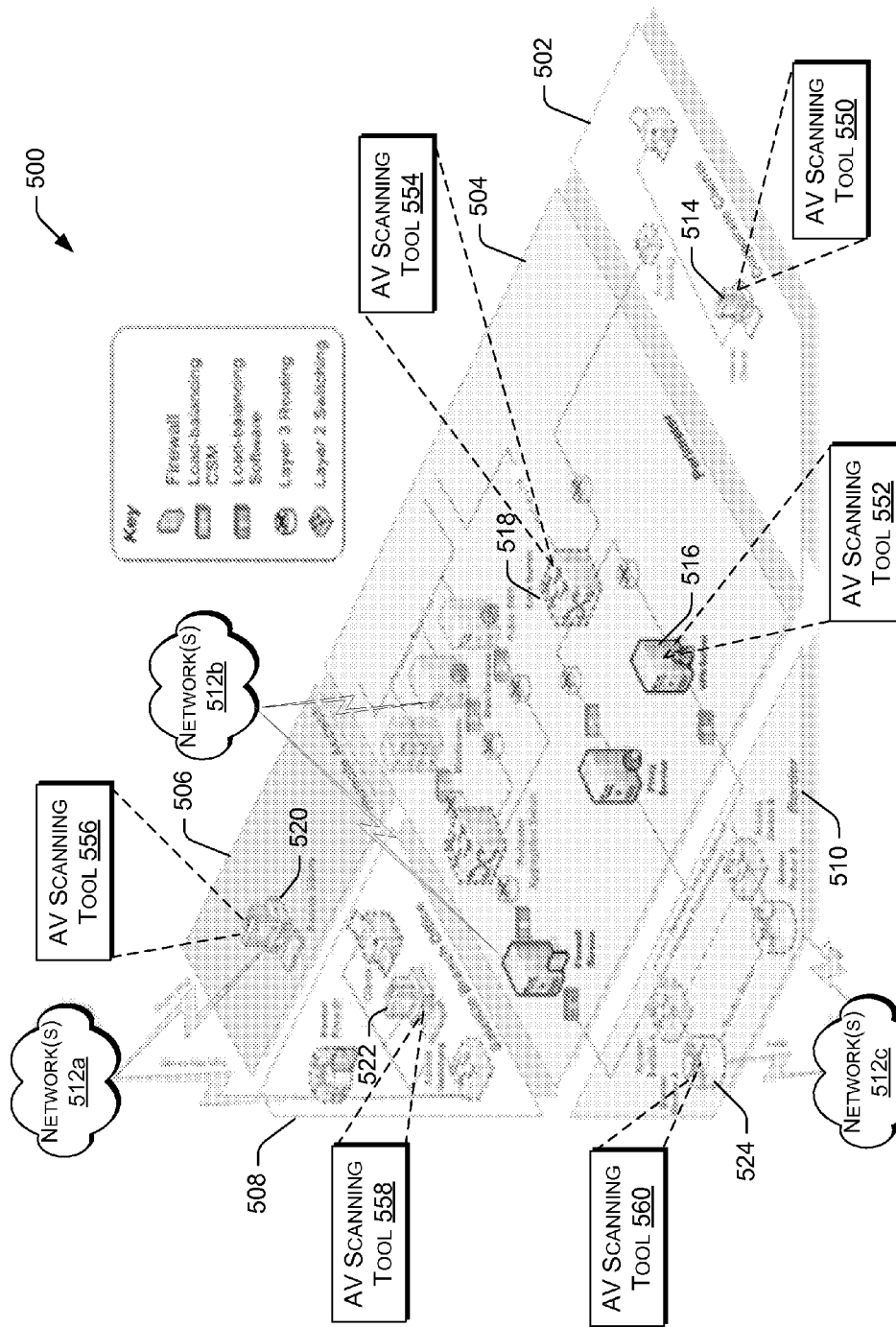
FIG. 5 shows another exemplary environment for implementing techniques for optimizing distributed anti-virus scanning.

It will be appreciated that a variety of alternate embodiments of techniques in accordance with the present disclosure may be conceived, and that the invention is not limited to the particular embodiments described above and shown in the accompanying figures. For example, FIG. 5 shows another exemplary environment 500 for implementing techniques for optimizing distributed anti-virus scanning. In this embodiment, the environment 500 includes an internal network portion 502 operatively coupled to a perimeter network portion 504. In turn, the perimeter network portion 504 is operatively coupled to a remote access portion 506, a branch office portion 508, and a border network portion 510. Outside networks 512 (e.g. the Internet) are accessible to a variety of components distributed throughout the various portions 502-510 of the environment.

A plurality of AV scanning tools 550-560 are installed on various components distributed throughout the environment 500. More specifically, a first AV scanning tool 550 is installed on a computer 514 located within the internal portion 502. A second AV scanning tool 552 is installed on a server 516, and a third AV scanning tool 554 is installed within a switch 518, the server 516 and the switch 518 being located within the perimeter portion 504. A fourth AV scanning tool 556 is installed on a remote messaging device 520 in the remote access portion 506, a fifth AV scanning tool 558 is installed on a computer 522 in the branch office portion 508, and a sixth AV scanning tool 560 is installed on a router 524 in the border portion 510.

In some implementations, the AV scanning tools 550-560 may all be the same software product configured to perform AV scanning of messages. Furthermore, the AV scanning tools 550-560 may even have the same configuration settings (single or multi-valued) such that the programs are configured to perform the same level of AV scanning at each of the distributed protection points (e.g. components 514-524) throughout the environment. Alternately, the AV scanning tools 550-560 may include different AV scanning software products. And in further embodiments, the different AV scanning tools 550-560 may include products having differing degrees of complexity and featuring different numbers of scanning parameters. Techniques in accordance with the present disclosure may be configured to operate in such environments 500 to reduce or eliminate duplicative scanning and to improve the overall efficiency of the environment 500.

Figure 6:
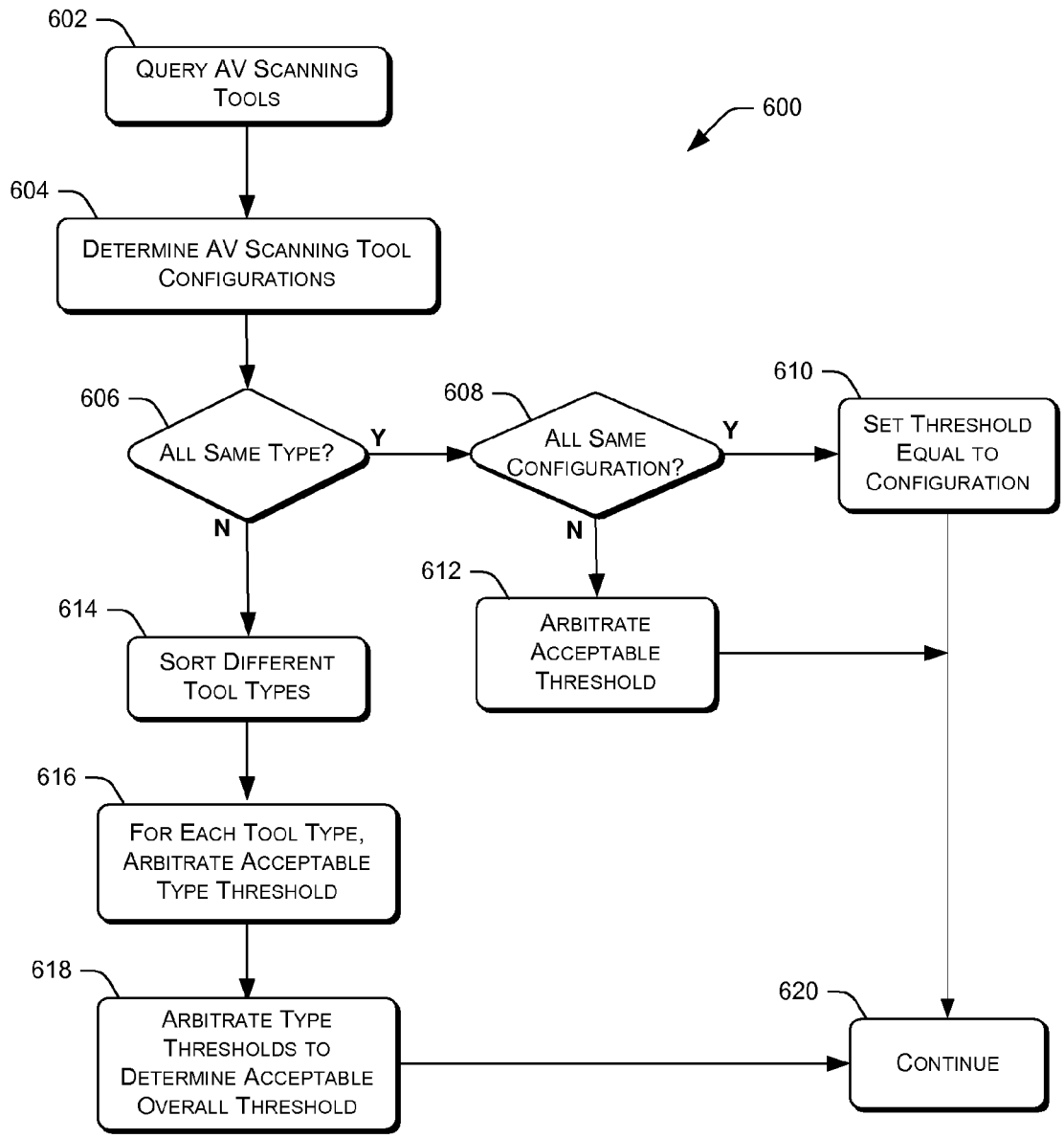
FIG. 6 is a flow chart of a process for determining an acceptable scanning threshold for an environment having a plurality of AV scanning tools.

FIG. 6 is a flow chart of a process 600 for determining an acceptable scanning threshold for an environment having a plurality of different AV scanning tools. More specifically, the different AV scanning tools may include one or more scanning software products having differing degrees of complexity and featuring different numbers of scanning parameters.

In this embodiment, the process 600 queries the different AV scanning tools distributed throughout the environment at 602. Based on the information received at 602, the process 600 determines how many different types of AV scanning tools, and the scanning configurations (or criteria) for each such AV scanning tool, at 604. At 606, if it is determined that the AV scanning tools are all of the same type (e.g. all multi-valued scanning routines), then the process 600 determines whether all of the AV scanning tools have the same scanning configuration (or setting(s)) at 608. If so, then at 610, the acceptable scanning threshold is set to the common configuration of all the AV scanning tools, and the process 600 is complete and continues (or terminates) at 620.

Alternately, if the process 600 determines that the AV scanning tools are not all set to the same scanning configuration at 608, then the process 600 performs an internal arbitration of all of the different scanning configurations at 612 to determine the acceptable threshold. The arbitration performed at 612 may be specific to the environment, and may take into consideration different priorities and weighting factors assigned to different scanning parameters by different system administrators or organizations. The arbitration (612) assimilates and synthesizes the different scanning configurations, priorities, weighting factors, etc. to arrive at an acceptable minimum scanning threshold for the particular combination of circumstances existing within the environment. The process 600 then continues (or terminates) at 620.

If it is determined that the AV scanning tools are not all of the same type (at 606), such as the AV scanning tools include different scanning products from different commercial vendors, then the process 600 sorts the different types of AV scanning tools at 614. At 616, for each of the different tool types, the process 600 arbitrates within each type of tool to determine an acceptable threshold for that particular tool type, and at 618, the process 600 arbitrates between the different type thresholds (determined at 616) to determine an acceptable overall threshold that is indicative of all different AV tools existing in the environment. The process 600 then continues (or terminates) at 620.

From the foregoing discussion, it will be appreciated that techniques in accordance with the present disclosure may be implemented in a variety of different environments, on a variety of different components, and using a variety of different AV scanning tools, or other policy enforcement scanning tools. Thus, such techniques may advantageously eliminate duplicative scanning using a minimum threshold which establishes a lowest acceptable criterion (or set of criteria) for considering a message to be "already scanned" and protected, and a single valued marker which is applied to the message when the message has been scanned to the minimum acceptable threshold. As the message is communicated throughout an environment, this two level protection system (or policy enforcement system) is used to determine if the message has been processed, and to avoid duplicative scanning. Complex state representations of a message's level of policy conformance scanning are avoided, and overall efficiency throughout the environment is improved.

Examples of a policy enforcement scan include scans to insure that the message does not contain any profanity, or that the message does not contain sensitive information, or that the message is not being forwarded to a proscribed list of recipients. In this embodiment, the stamp is a generic indication that the message is conformant with policy and need not be checked again. The scanning for policy enforcement is not limited to these examples, but rather is for the purpose of enforcing any content attributes or required content rules for the administered environment.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
receiving a computer readable message in a multi-node network;
determining an acceptable policy threshold representative of a plurality of individual policy configurations of a plurality of scanning tools distributed throughout the multi-node network;
determining whether the message has previously been scanned to the acceptable policy threshold to reduce duplicative scanning;
if previously scanned, allowing the message to be communicated to at least one component of the multi-node network;
if not previously scanned, performing scanning of the message at the acceptable policy threshold, wherein the performing the scanning includes:
if the scanning is successful, stamping the message as having been scanned, and allowing the message to be communicated to at least one component of the multi-node network; and
if the scanning is unsuccessful, stamping the message as having been scanned, and enforcing the acceptable policy threshold before allowing dissemination of the message within the multi-node network.

2. The method of claim 1, wherein the scanning is successful if the scanning determines that the message is in conformance with the acceptable policy threshold, and wherein the scanning is unsuccessful if the scanning determines that the message is in non-conformance with the acceptable policy threshold.

3. The method of claim 1, wherein the plurality of scanning tools includes at least one of a content scanning tool or an attribute scanning tool, and wherein the acceptable policy threshold includes at least one of an anti-virus protection, a file filter, a keyword filter, a content filter, or an attribute filter.

4. The method of claim 1, wherein the determining whether the message has previously been scanned includes checking a single parameter having a first value if the message has previously been scanned, and having a second value if the message has not previously been scanned.

5. The method of claim 1, wherein the determining the acceptable policy threshold includes determining an acceptable threshold that is sufficiently probabilistic of the message being in a known state.

6. The method of claim 1, wherein the determining the acceptable policy threshold includes arbitrating between a plurality of policy criteria.

7. The method of claim 1, wherein the determining the acceptable policy threshold includes arbitrating between a plurality of scanning software products having a plurality of scanning criteria.

8. One or more computer storage devices containing computer-readable instructions that, when executed by a processor, perform a method comprising:
receiving an object into a multi-node network;
determining an acceptable threshold representative of a plurality of individual configurations of a plurality of scanning tools distributed throughout the multi-node network;
determining whether the object has previously been scanned to the acceptable threshold to eliminate duplicative scanning;
if previously scanned, allowing the object to be communicated to at least one component of the multi-node network;
if not previously scanned, performing scanning of the object at the acceptable threshold, wherein the performing the scanning includes:
if the scanning determines that the object is in conformance with the acceptable threshold, stamping the object as having been scanned and allowing the object to be communicated to at least one component of the multi-node network; or
if the scanning determines that the object is in violation of the acceptable threshold, stamping the object as having been scanned, and subsequently enforcing the acceptable threshold before allowing further dissemination of the object within the multi-node network.

9. The one or more computer storage devices of claim 8, wherein the plurality of scanning tools includes at least one of a content scanning tool or an attribute scanning tool, and wherein the acceptable threshold includes at least one of an anti-virus protection, a file filter, a keyword filter, a content filter, or an attribute filter.

10. The one or more computer storage devices of claim 8, wherein the determining the acceptable threshold includes determining the acceptable threshold that is not an absolute guarantee of the object being in a known state.

11. The one or more computer storage devices of claim 8, wherein the determining the acceptable threshold includes arbitrating between a plurality of scanning criteria.

12. The one or more computer storage devices of claim 11, wherein the arbitrating includes assimilating one or more different scanning configurations, one or more priorities, and one or more weighting factors to arrive at an acceptable minimum scanning threshold for a particular combination of circumstances existing within the multi-node network.

13. The one or more computer storage devices of claim 8, wherein the determining the acceptable scanning threshold includes arbitrating between a plurality of scanning software products having a plurality of scanning criteria.

14. The one or more computer storage devices of claim 13, wherein the arbitrating between a plurality of scanning software products includes arbitrating between at least one multi-valued scanning software product and at least one single-valued scanning software product.

15. A device, comprising:
a processor;
a memory operatively coupled to the processor;
a communication component stored in the memory and configured to be operatively executed by the processor to receive an incoming message; and
at least one scanning component stored in the memory and configured to be operatively executed by the processor to:
determine an acceptable policy threshold representative of a plurality of individual scanning policy configurations of a plurality of scanning tools distributed throughout a multi-node network;
determine whether the message has previously been scanned to the acceptable policy threshold to prevent duplicative scanning;
if previously scanned, allow the message to be communicated by the communication component;
if not previously scanned, perform scanning of the message at the acceptable policy threshold, wherein the scanning includes:
if the scanning is successful, stamp the message as having been scanned, and allow the message to be communicated by the communication component; and
if the scanning is unsuccessful, stamp the message as having been scanned, and prevent communication of the message by the communication component.

16. The device of claim 15, wherein the at least one scanning component is further configured to determine whether the scanning is successful based on whether the object is in conformance with the acceptable policy threshold.

17. The device of claim 15, wherein the at least one scanning component is further configured to be operatively executed by the processor to determine the acceptable policy threshold that is sufficiently probabilistic of the message being in a known state.

18. The device of claim 15, wherein the at least one scanning component is further configured to be operatively executed by the processor to determine the acceptable policy threshold by arbitrating between a plurality of scanning criteria.

19. The device of claim 15, wherein the at least one scanning component is further configured to be operatively executed by the processor to determine the acceptable policy threshold that includes at least one of an anti-virus protection, a file filter, a keyword filter, a content filter, or an attribute filter.

20. The device of claim 15, wherein the scanning component is further configured to be operatively executed by the processor to determine the acceptable policy threshold by arbitrating between at least one multi-valued scanning software product and at least one single-valued scanning software product.

* * * * *

UNITED STATES PATENT AND TRADEMARK OFFICE
CERTIFICATE OF CORRECTION

PATENT NO. : 7,865,965 B2  Page 1 of 1
APPLICATION NO. : 11/763795
DATED : January 4, 2011
INVENTOR(S) : Michael Kramer et al.

It is certified that error appears in the above-identified patent and that said Letters Patent is hereby corrected as shown below:

In column 11, line 23, in Claim 13, after "acceptable" delete "scanning".

Signed and Sealed this
Twenty-sixth Day of July, 2011

David J. Kappos
*Director of the United States Patent and Trademark Office*